United States Patent [19]
Lowe et al.

[11] Patent Number: 5,360,232
[45] Date of Patent: Nov. 1, 1994

[54] FILTRATION IN HYBRID INFLATORS

[75] Inventors: William G. Lowe; Walter A. Moore, both of Ogden; Linda M. Rink, Liberty, all of Utah

[73] Assignee: Morton International, Inc., Chicago, Ill.

[21] Appl. No.: 121,397

[22] Filed: Sep. 14, 1993

[51] Int. Cl.5 ............................................. B60R 21/26
[52] U.S. Cl. ...................................... 280/741; 280/736
[58] Field of Search .............. 280/736, 737, 740, 741, 280/742

[56] References Cited

U.S. PATENT DOCUMENTS

| | | | |
|---|---|---|---|
| 3,723,205 | 3/1973 | Scheffee | 280/741 |
| 3,756,621 | 9/1973 | Lewis et al. | 280/741 |
| 3,817,263 | 6/1974 | Bendler et al. | 280/741 |
| 3,895,821 | 7/1975 | Schotthoefer et al. | 280/741 |
| 5,016,914 | 5/1991 | Faigle et al. | 280/741 |
| 5,131,680 | 7/1992 | Coultas et al. | 280/737 |

*Primary Examiner*—Kenneth R. Rice
*Attorney, Agent, or Firm*—Nick C. Kottis; Gerald K. White

[57] ABSTRACT

An apparatus and method suitable for use in inflating a vehicle occupant restraint are provided. The apparatus stores a gas generating material in a first chamber and stores a supply of gas under pressure in a second chamber. When ignited, the gas generating material produces a hot gas which contains particulate material. To effect particulate removal, housed within the container and extending about the gas exit nozzle of the first chamber is a filter structure. The filter structure forms inner and outer mixing zones within the second chamber wherein portions of the stored gas mix with the appropriately generated and/or treated gas, forming inflation gas. The inflation gas in turn is passed through a diffuser and into the vehicle occupant restraint.

20 Claims, 1 Drawing Sheet

FILTRATION IN HYBRID INFLATORS

BACKGROUND OF THE INVENTION

This invention relates generally to inflatable restraint systems and, more particularly, to the type of inflator known as a hybrid inflator and the treatment of gases therein.

Many types of inflators have been disclosed in the art for inflating an air bag for use in an inflatable restraint system. One type involves the utilization of a quantity of stored compressed gas which is selectively released to inflate the air bag. Another type derives a gas source from a combustible gas generating material which, upon ignition, generates a quantity of gas sufficient to inflate the air bag. In a third type, the air bag inflating gas results from the combination of a stored compressed gas and the combustion products of a gas generating material. The last mentioned type is commonly referred to as an augmented gas or hybrid inflator.

Hybrid inflators that have been proposed heretofore have, in general, been subject to certain disadvantages. For example, the burning of the pyrotechnic (gas generating) and initiation materials in such inflators invariably results in the production of particulate material. The use of such a particulate-containing inflator emission to inflate an air bag can in turn result in the particulate material being vented out from the air bag and into the vehicle.

Typically, the particulate material is variously sized and includes a large amount of particulate within the respirable range for humans. Thus, the passage of the gas borne particulate material into the passenger compartment of the vehicle, such as via conventional air bag venting, can result in the undesired respiration of such particulate material by the driver and/or other passengers which in turn can cause consequent respiratory problems. Also, such particulate can easily become dispersed and airborne so as to appear to be smoke and thereby result in the false impression that there is a fire in or about the vehicle.

It has also been proposed to screen the gaseous emission coming from the pyrotechnic portion of such hybrid inflators. For example, the above-identified U.S. Pat. No. 5,131,680 discloses the inclusion of a circular screen "128" between the body of pyrotechnic material and the orifice through which the pyrotechnically produced emission is passed to the pressurized gas-containing chamber of the hybrid inflator.

Also, U.S. Pat. No. 5,016,914 discloses the inclusion of a metal disk having a plurality of suitably sized openings therein. The disk is disclosed as functioning to trap large particles such as may be present in the generated gas.

Such techniques of filtering or screening the gaseous emission of the pyrotechnic section of the hybrid inflator prior to contact with the stored, pressurized gas of the inflator generally suffer such as from undesirably slowing or preventing the transfer of heat to the stored gas from the relatively hot generated gas and particulate material. In general, such a transfer of heat to the stored gas is desired in hybrid inflators in order to produce desired expansion of the gas. Consequently, the slowing or preventing of desired heat transfer can result in a reduction in the performance of the inflator. Also, the screening or filtering of particulate at this location within the inflator can undesirably effect gas flow within the inflator. For example, such treatment can undesirably restrict the flow of gas out of the pyrotechnic chamber, causing the pressure inside the pyrotechnic chamber to increase and thereby increase the potential for structural failure by the pyrotechnic chamber.

The above-identified U.S. Pat. No. 5,016,914 also discloses constraining gas flow to a tortuous path whereby additional quantities of relatively large particles produced by combustion of the gas generating material are separated from the commingled gases as the gases flow toward the inflatable vehicle occupant restraint. As disclosed, various component parts of the vehicle occupant restraint system cooperate to form the described tortuous path. These component parts include the openings in the container which direct the gas into an outer cylindrical diffuser, the container itself which preferably contains gas directing blades positioned therein as well as burst disks to control the flow of the gas generated by ignition of the gas generating material. The patent also discloses that in a preferred embodiment, a coating material, e.g., a silicone grease, is coated onto the inner surface of the container to assist in the fusing of particles thereto rather than allowing the particles to rebound into the nitrogen gas jet stream.

Such surface coatings, however, generally suffer in several significant aspects with respect to effectiveness and functioning when compared, for example, to the use of a filter to effect particulate removal.

First, as the nature of such fusion or adhesion of particles onto a coating is a surface phenomenon, the effectiveness of such removal is directly related to the amount of available surface area. In practice, such a surface coating provides a relatively limited amount of contact surface area and, further, the effectiveness of such surface treatment typically is decreased as the available surface area is occupied.

Also, though such an internal surface coating may be of some use in the fusing of solid particles, such a coating would normally be relatively ineffective in trapping liquid phase particles. Furthermore, the process of condensation of liquid phase particles in an inflator normally involves a transfer of heat to the subject contact surface. In the case of such a surface coated with such a grease, such a transfer of heat could undesirably result in the off-gassing of the coating material, e.g., production of gaseous byproducts of the coating material, which in turn would undesirably contribute to the toxicity of the gases emitted from such an inflator.

In addition, the effect of the flow of gases within the inflator can raise concerns about the use of inflators which utilize such coatings. For example, the impingement onto such a coating of the hot combustion gases produced within an inflator would normally tend to displace the coating material, particularly since such coatings tend to become softer at elevated temperatures.

Thus, even for the short time periods associated with the operation of such devices neither exclusive nor primary reliance is made by this patent on the use of such a coating to effect particle removal.

There is a need and a demand for improvement in hybrid inflators to the end of preventing, minimizing or reducing the passage of particulate material therefrom without undesirably slowing or preventing heat transfer to the stored, compressed gas while facilitating proper bag deployment, in a safe, effective and economical manner.

The present invention was devised to help fill the gap that has existed in the art in these respects.

SUMMARY OF THE INVENTION

A general object of the invention is to provide an improved inflator apparatus suitable for use in inflating a vehicle occupant restraint.

A more specific objective of the invention is to overcome one or more of the problems described above.

The general object of the invention can be attained, at least in part, through an apparatus suitable for use in inflating a vehicle occupant restraint that includes a container having a first chamber for storing a gas generating material and a second chamber for storing a supply of gas under pressure. The gas generating material when ignited generates a hot gas which contains particulate of the gas generating material and byproducts thereof. The generated hot gas is releasable from the first chamber into the second chamber by means of at least one gas exit nozzle.

The apparatus also includes a structure formed of at least one filter material housed in the container and extending into the second chamber about the gas exit nozzle of the first chamber. The filter structure defines an inner mixing zone in the second chamber for mixing at least a portion of the particulate-containing generated hot gas with at least a portion of the stored gas to form a gas mix. The filter structure is contacted by a gas comprising at least a portion of the particulate-containing generated hot gas and effects reduction in the particulate content of the contacting gas. The filter structure further defines an outer mixing zone in the second chamber wherein an inflation gas for use in inflating the vehicle occupant restraint and comprising a mix of gas of reduced particulate content and stored gas is formed.

The apparatus further includes a diffuser having at least one controlling orifice for providing passage therein of at least a portion of the inflation gas from the container. The diffuser also includes at least one exit port for dispensing at least a portion of the inflation gas passing therein into the vehicle occupant restraint.

The prior art fails to adequately filter particulate from the gases of hybrid inflator devices. For example, prior art techniques of filtering or screening the gaseous emission of the pyrotechnic section of the hybrid inflator prior to contact with the stored, pressurized gas of the inflator generally suffer such as from undesirably slowing or preventing the transfer of heat to the stored gas.

The invention further comprehends a hybrid inflator for a vehicle occupant restraint. The hybrid inflator includes an elongated cylindrical container having a first chamber for storing a gas generating material and a second chamber for storing a supply of gas under pressure. The gas generating material when ignited generates a hot gas that contains particulate of the gas generating material and byproducts thereof. The particulate-containing generated hot gas is releasable from the first chamber into the second chamber by means of a gas exit nozzle at a first end on a first end portion of the first chamber, with the gas exit nozzle being opposite a first inner end of the second chamber. A distance D separates the first end of the first chamber from the first inner end of the second chamber.

This hybrid inflator also includes a structure formed of at least one filter material housed in the container and extending into the second chamber about the gas exit nozzle of the first chamber a distance L from the first end of the first chamber toward the first inner end of the second chamber. The filter structure is secured about the first end portion of the first chamber and defines an inner mixing zone in the second chamber for mixing at least a portion of the particulate-containing hot generated gas with at least a portion of the stored gas to form a gas mix. The filter structure is contacted by a gas comprising at least a portion of the particulate-containing generated hot gas and effects significant reduction in the particulate content of the contacting gas. The filter structure further defines an outer mixing zone in the second chamber wherein an inflation gas for use in inflating the vehicle occupant restraint and comprising a mix of gas of reduced particulate content and stored gas is formed.

The hybrid inflator also includes a diffuser having at least one controlling orifice for providing passage therein of the inflation gas from the container and at least one exit port for dispensing the inflation gas into the vehicle occupant restraint.

The invention also comprehends a method for producing inflation gas in an apparatus suitable for use in inflating a vehicle occupant restraint and which includes a container having a first chamber for storing a gas generating material and a second chamber in which a supply of gas under pressure is stored. The method includes igniting the gas generating material stored in the first chamber to generate a hot gas which contains particulate of the gas generating material and byproducts thereof. The particulate-containing generated hot gas is released from the first chamber into the second chamber by means of at least one gas exit nozzle. The container houses a filter structure extending into the second chamber about the gas exit nozzle. The filter structure includes at least one filter material and defines an inner mixing zone and an outer mixing zone in the second chamber. At least a portion of the particulate-containing generated hot gas is mixed with at least a portion of stored gas in the inner mixing zone to form a gas mix. The filter structure is contacted with a gas which includes at least a portion of the particulate-containing generated hot gas to effect significant reduction in the particulate content of the contacting gas. In the outer mixing zone, gas of reduced particulate content is mixed with stored gas to form an inflation gas for use in inflating the vehicle occupant restraint. Such inflation gas is passed by means of a diffuser having at least one controlling orifice for providing passage therein of at least a portion of the inflation gas and at least one exit port for dispensing at least a portion of the inflation gas passing therein into the vehicle occupant restraint.

As used herein, the phrase "thrust neutral" refers to the production by an inflator of zero thrust when initiated as, for example, during a deployment event or accidentally during shipping, storage, or handling thereof. That is to say, the gas discharge openings in the inflator are so positioned that the gas is discharged in opposing directions whereby there are no resulting forces tending to cause physical movement of the inflator. Hence, the inflator will expend the energy generated thereby, generally in place.

The term "significantly reduced" and the like as used herein in reference to the particulate content of the gas or gases treated in the subject invention (e.g., the hot gas released from the gas generating material storage chamber) means the removal of at least about 20% to about 80% and generally the removal of at least about 50% of the airborne particulate from such a particulate-containing gas. Such reduced particulate content gas can then be used in the formation of inflation gas which satisfies the maximum allowable airborne particulate content for the inflation gas used in such inflatable restraint systems.

Other objects and advantages will be apparent to those skilled in the art from the following detailed description taken in conjunction with the appended claims and drawings.

BRIEF DESCRIPTION OF THE DRAWINGS

For ease of illustration and discussion, like parts in the drawings are designated by the same reference numeral.

DETAILED DESCRIPTION OF THE INVENTION

The present invention provides an inflator, e.g., a hybrid inflator, having an internal filter structure useful in effecting removal, within the inflator, of particulate such as associated with the ignition and combustion of gas generant materials used therein.

Figure 1:
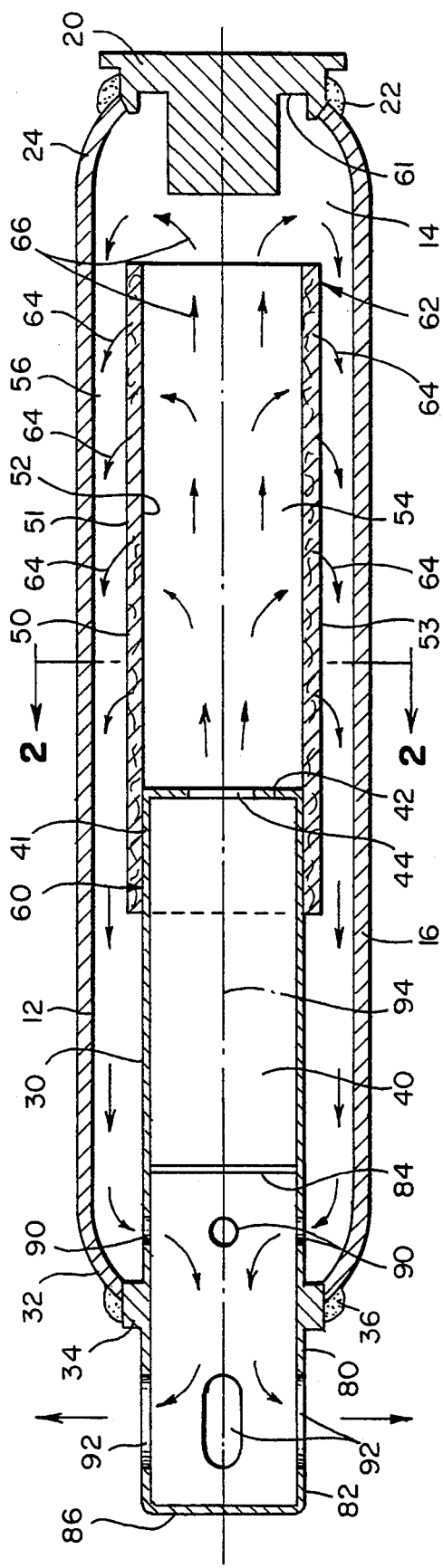
FIG. 1 is a simplified, partially in section, schematic view of a hybrid inflator in accordance with one embodiment of the invention.

Referring to FIG. 1, a hybrid inflator assembly, generally designated 10, for use in inflating a vehicle inflatable restraint cushion for the passenger side of a vehicle is shown. While the invention will be described below with reference to a passenger side assembly for automotive vehicles including vans, pick-up trucks, and particularly automobiles, it is to be understood that the invention also has applicability with other types or kinds of such assemblies including driver side assemblies.

With respect to such automotive vehicles it will be appreciated that due to usual physical differences between passenger and driver side assemblies, e.g., passenger side air bags generally are comparatively larger than those used in driver side assemblies and thus such passenger side assemblies typically require a comparatively larger volume of inflating gas, the invention has particular utility in passenger side assemblies.

As shown in FIG. 1, the inflator assembly 10 includes an elongated, generally cylindrically shaped pressure vessel or container 12. It will be appreciated, however, that if desired variously sized and shaped containers including, for example, those having a cylindrical, toroidal, spherical or selected intermediary shape can be used in the practice of the invention.

The container 12 includes a storage chamber 14 useful in effecting gas redirection and for use in storing a supply of gas under pressure. For example, as described above, an inert gas such as argon or nitrogen at a pressure typically in the range of 2000–4000 psi can be used to fill and pressurize the storage chamber 14. It is to be understood, however, that the chamber 14 could be used to store other selected gases (e.g., carbon dioxide, air, other inert gases or one or more combinations of such gases) and/or gases at other storage pressures, as desired.

The chamber 14 is defined by an elongated cylindrical sleeve 16. An end plug 20 is attached by means of a circumferential weld 22 in sealing relation to a first end 24 of the sleeve 16. The end plug 20 includes a passage (not shown) through which the gas to be stored can be conducted into the chamber 14. Once the chamber 14 has been filled with gas at the desired pressure, the passage is closed. The end plug 20, either separately or as an integral part thereof, includes a conventional pressure switch (not shown), commonly referred to as a low pressure sensor ("LPS"), from which gas pressure in the chamber 14 can be monitored to alert the vehicle occupant should the pressure in the chamber 14 drop below a predetermined pressure.

A gas generator housing 30 is recessed in sealing relation into the chamber 14 from a second end 32 of the sleeve 16, with a collar 34 about the mid-section of the gas generator housing 30 being attached by means of a circumferential weld 36 with the sleeve 16.

The gas generator housing 30 includes a chamber 40 for use in storing therein a supply of gas generating material, e.g., a pyrotechnic charge such as a granular mixture of $BKNO_3$ or extrudable solid propellants such as combinations of binders, used as a fuel, with solid oxidizers such as a combination of polyvinyl chloride (fuel) with potassium nitrate or potassium perchlorate (oxidizer), for example.

The chamber 40 includes an end portion 41 forming an inner end 42 having a central opening or nozzle orifice 44 wherethrough hot gas generated upon ignition of the gas generating material is released into the chamber 14. It is to be understood, however, that the number, positioning and shape of such nozzle orifice or orifices can be appropriately altered to satisfy design requirements for particular installations as will be apparent to those skilled in the art.

The hot gas typically contains particulate of the gas generating material and byproducts thereof. The nature of such particulate material will at least in part be dependent on the nature of the gas generating material itself. Thus, for $BKNO_3$, typical particulate is in the nature of boron and/or potassium compounds.

Housed in the container 12 and extending into the chamber 14 about said gas exit nozzle 44 of the chamber 40 is a structure 50 composed of a filter material 51 having an inner surface 52 and an outer surface 53. The filter structure 50 is generally cylindrical in shape and extends from the gas generator housing 30 towards the end plug 20. The filter structure 50 defines within the chamber 14 both an inner and an outer mixing zone, respectively designated by the reference numerals 54 and 56. A first end portion 60 of the filter structure 50 is spot welded to the gas generator 30, such as about the end portion 41. It will be understood that other means of appropriately positioning and placing the filter structure 50 within the inflator assembly 10 can, if desired, be utilized without departing from the subject of the invention.

In the illustrated embodiment, a distance D separates the gas generator housing, i.e., the end 42, from the inner end 61 of the end plug 20 while the filter structure 50 is shown as extending a distance L from the gas generator housing 30, i.e., again the end 42, towards the end plug 20, with L being less than D such that a second end portion 62 of the filter structure is free standing within the chamber 14. In an inflator assembly so dimensioned, it will be appreciated that a portion of the hot gas exiting from gas generator housing 30 can pass through the filter material 51, such as shown by the arrows 64, for example, or can pass through the interior of the filter structure 50 and exit from a second end portion 62 thereof, such as shown by the arrows 66.

It is to be understood, however, that the length of the filter structure of the invention can, if desired, be appropriately varied and/or modified dependent on the specifics of a particular installation. For example, the filter structure can be made to extend substantially to the end of the inflator, e.g., such that L substantially equals D or the structure of the filter can be modified such that the second end portion 62 does not permit gas to pass therethrough without passing through the filter material 51, e.g., the second end portion can be drawn together or otherwise closed off (not shown) with filter material.

Also, if desired, the filter structure 50 can be selectively supported or fastened with other portions of the inflator assembly along the length thereof. For example, if desired, the second end portion 62 can be fastened such as by a bracket (not shown) with the end plug 20.

In the inner mixing zone 54, the particulate-containing generated hot gas formed upon the ignition and combustion of the gas generant material and which has exited from the chamber 40 into the chamber 14 is mixed with at least a portion of the stored gas therein to form a gas mix. Such dispersing of the hot gas results in both a slowing and a cooling thereof, as compared to when such gas is first released from the chamber 40 through the gas exit nozzle 44. Thus, such an inner mixing zone permits the slowing and cooling of the gas prior to contact with the filter structure which in turn permits the utilization of various filter materials which ordinarily would not be able to effectively withstand the gas velocities and temperatures normally associated with such generated gases upon release from such a pyrotechnic chamber.

The filter structure 50 by way of the filter material 51 effects removal of at least a portion of the particulate in the particulate-containing gas contacting therewith, e.g., the particulate-containing generated hot gas and/or other gas which includes at least a portion of particulate from the particulate-containing generated hot gas, such as the gas mix formed in the inner mixing zone 54 or the gas mix formed in the outer mixing zone 56, for example. As a result, a gas having a reduced particulate content is formed. It will generally be preferred that such particulate removal result in significant reduction in the particulate content of the gas so treated, e.g., the removal of at least about 20% to about 80% and generally the removal of at least about 50% of the airborne particulate from the particulate-containing generated hot gas.

In practice, such particulate removal is generally in the nature of condensation of liquid phase particulate and/or entrapment of particulate onto the filter material 51. It is theorized that condensation of particulate, wherein heat removal results in a phase change and resultant condensation of particulate on available filter surface area, is facilitated when the particulate-containing gas being filtered contacts the filter structure 51 at lower velocity. Thus, gas slowing and cooling such as may be realized as a result of the gas dispersing resulting from the mixing of generated gas with stored gas within the inner mixing zone can contribute to the effectiveness of the filter structure in the removal of particulate from the gas prior to emission from the inflator. Additional particulate removal is believed effected by means of particulate entrapment within the filter material 51 whereby particulate (solid) is physically separated from the medium (gas).

It is believed that particulate removal, such as by particulate condensation, is effected by contact of particulate-containing gas onto the filter structure and is not limited to removal of particulate from that portion of the gas which passes through the filter material. It is thus believed that particulate can be removed from the gas as such particulate-containing gas contacts either the inner surface 52 or the outer surface 53 of the filter material 51.

In view thereof, the filter material 51 of the filter structure 50 desirably provides sufficient surface area to effect desired particulate condensation and/or provide sufficient porosity and tortuous flow path to effect desired particulate entrapment. Thus, the filter structure 50 serves to reduce the amount of particulate expelled from the hybrid inflator 10. As a result, inflator emission toxicity and particulate limits can be desirably satisfied.

In the outer mixing zone 56, the stored gas within the zone 56 is mixed with the gas of reduced particulate content to form an inflation gas for use in inflating the vehicle occupant restraint. It will also be appreciated that a portion of the particulate-containing generated hot gas may, as shown in FIG. 1 by the arrows 66, exit through the end portion 62 of the filter structure 50 and also mix with the gas stored within the zone 56 and/or gas of reduced particulate content. The amount or proportion of gas so passing can be appropriately limited or controlled, as desired, to result in the desired particulate content in the gas emitted from the inflator, as will be appreciated by one skilled in the art and guided by the teachings herein provided.

Figure 3:
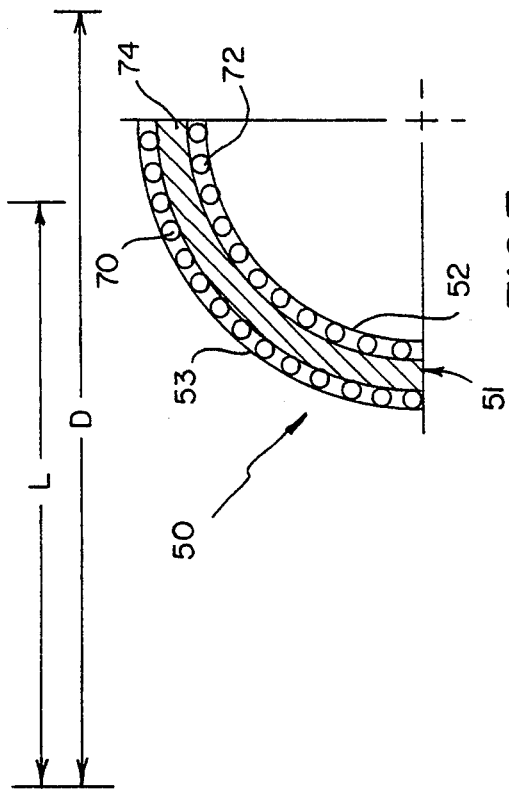
FIG. 3 is a fragmentary, sectional schematic view of the portion of the filter structure shown in FIG. 2 encircled within A.
Figure 2:
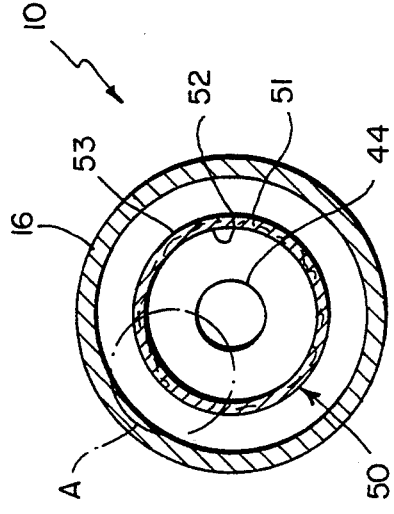
FIG. 2 is a simplified, partially in section, schematic view of the hybrid inflator of FIG. 1 taken substantially along line 2—2 of FIG. 1 and viewed in the direction of the arrows.

Reference is now made to FIGS. 2 and 3 wherein the filter structure 50 is shown in greater detail. As shown in FIG. 3, the filter material 51 used in the formation of the structure 50 includes an outer and an inner fine metal wire screen or expanded metal layers, respectively designated 70 and 72, with a filter element layer 74, such as of ceramic paper or textile, therebetween.

It is to be understood that the filter structure of the invention can be composed of one or more of a number of filter materials. In fact, the practice of the invention facilitates the effective use of a relatively wide variety of filter materials or mediums in the filter structure of the invention. For example, the filter structure can, if desired, be composed of one or a combination of filter materials including: ceramic paper such as LYTHERM (a trademark of Lydall Inc.) having a permeability of 30–200 cfm/sq ft at $\frac{1}{2}$" water pressure drop, ceramic textile such as KAO-TEX (a trademark of Thermal Ceramics Inc.) or NEXTEL (a trademark of 3M), woven stainless steel wire such as by National Standard Co. and typically having an open area in the range of about 20 to 60 percent, such as a fine wire screen such as a single wrap of 45×170 mesh stainless steel Dutch weave or two to three wraps of 30×30, 50×50, or 100×100 mesh stainless steel screen or expanded metal, such as expanded stainless steel, also having an open area in the range of about 20 to 60 percent.

In general, such ceramic papers and textiles, if used, are used in combination with one or more support layers of such a woven or expanded metal material. For example, such a multi-part filter body can have a sandwich-like form, such as shown in FIG. 3, wherein a filter element such as ceramic paper or ceramic textile is sandwiched between an outer and an inner support layer such as of the above-identified woven 50×50 or 30×30 stainless steel.

In the embodiment illustrated in FIG. 1, the gas generator housing 30 includes an inflator diffuser 80, adjacent to and integral with the pyrotechnic chamber 40. That is, the diffuser 80 comprises a generally cylindrical sleeve 82 that is joined at a first end 84 to the pyrotechnic storage chamber 40. An opposite second end 86 of the diffuser 80 extends external the container 12. Generally equally spaced controlling orifices 90 are positioned about the cylindrical sleeve 82, adjacent the first end 84. The controlling orifices 90 provide passage into the diffuser 80 of inflation gas from the container 12. This inflation gas can then exit the inflation apparatus, i.e., the inflator apparatus 10, by means of gas exit ports 92 spaced about adjacent the second end 86 of the diffuser 80.

Oval shaped gas exit ports 92 are generally equally spaced about the circumference of the diffuser end 86 so as to promote a more uniform distribution of the exiting gas about the circumference of the inflator assembly 10 and to desirably result in the assembly being thrust neutral. It is to be understood, however, that the number, spacing, and shaping of the gas exit ports can be appropriately altered to satisfy design requirements for particular installations as will be apparent to those skilled in the art.

In the illustrated embodiment, the gas exit nozzle 44 is generally situated in a fashion such that the nozzle 44 is centered towards one end of the filter structure 50 along the central longitudinal axis 94 thereof. It will be appreciated that the gas initially exiting from the pyrotechnic chamber 40 through the gas exit nozzle 44 will be initially generally directed through the inner mixing zone 54 of the filter structure 50 towards the end plug 20. Thus, upon exiting from the pyrotechnic chamber 40, the generated gas will commingle with stored gas within the inner mixing zone 54.

It will be appreciated that while in the embodiment illustrated in FIG. 1 the gas initially exiting from the pyrotechnic chamber 40 will be initially generally directed towards the end plug 20, the controlling orifices 90 whereby gas exits from the chamber 14 is positioned near or adjacent the end 32 opposite thereto. Thus, the gas released from the chamber 40 will undergo at least an approximately 180° cumulative change in direction between its release into the chamber 14 and subsequent passage through the diffuser 80.

The foregoing detailed description is given for clearness of understanding only, and no unnecessary limitations are to be understood therefrom, as modifications within the scope of the invention will be obvious to those skilled in the art.

What is claimed is:

1. An apparatus suitable for use in inflating a vehicle occupant restraint comprising:

a container having a first chamber for storing a gas generating material and a second chamber for storing a supply of gas under pressure, the gas generating material when ignited generating a hot gas, the generated hot gas containing particulate of the gas generating material and byproducts thereof and being releasable from said first chamber into said second chamber by means of at least one gas exit nozzle;

a structure comprising at least one filter material housed in said container and extending into said second chamber about the gas exit nozzle of said first chamber, said filter structure defining an inner mixing zone in said second chamber for mixing at least a portion of the particulate-containing generated hot gas with at least a portion of the stored gas to form a gas mix, said filter structure being contacted by a gas comprising at least a portion of the particulate-containing generated hot gas and effecting reduction in the particulate content of the contacting gas, said filter structure further defining an outer mixing zone in said second chamber wherein an inflation gas for use in inflating the vehicle occupant restraint and comprising a mix of gas of reduced particulate content and stored gas is formed; and a diffuser having at least one controlling orifice for providing passage therein of the inflation gas from said container and at least one exit port for dispensing the inflation gas into the vehicle occupant restraint.

2. The apparatus of claim 1 wherein said filter structure comprises an inner and an outer surface and said reduction in particulate content comprises particulate condensation on said inner surface and particulate entrapment in said filter material as at least a portion of the particulate-containing generated hot gas passes therethrough upon contact therewith.

3. The apparatus of claim 2 wherein said reduction in particulate content comprises significant reduction in particulate content.

4. The apparatus of claim 3 wherein said reduction in particulate content additionally comprises particulate condensation on said outer surface.

5. The apparatus of claim 1 wherein there is at least an approximately 180° cumulative change in gas direction between the release of the particulate-containing generated hot gas from said first chamber and the passage of the inflation gas into said diffuser.

6. The apparatus of claim 1 wherein said filter structure comprises at least one support layer of a woven stainless steel screen having an open area in the range of about 20 to 60 percent.

7. The apparatus of claim 6 wherein said filter structure comprises both an outer and an inner support layer and additionally comprises at least one layer of filter element between.

8. The apparatus of claim 6 wherein said filter structure comprises both an outer and an inner support layer of a woven stainless steel screen having an open area in the range of about 20 to 60 percent and additionally comprises a layer of filter element comprising ceramic paper or ceramic textile therebetween.

9. The apparatus of claim 1 wherein:

a) said gas exit nozzle is at a first end of a first end portion of said first chamber and is opposite a first inner end of said second chamber, b) a distance D separates the first end of said first chamber from the first inner end of said second chamber, c) said filter structure comprises an elongated cylindrical shape with said filter structure extending a distance L from the first end of said first chamber toward the first inner end of said second chamber, and d) distance L is less than distance D.

10. A hybrid inflator for a vehicle occupant restraint, said hybrid inflator comprising:

an elongated cylindrical container having a first chamber for storing a gas generating material and a second chamber for storing a supply of gas under pressure, the gas generating material when ignited generating a hot gas, the generated hot gas containing particulate of the gas generating material and byproducts thereof and being releasable from said first chamber into said second chamber by means of at least one gas exit nozzle at a first end of a first end portion of said first chamber with said gas exit nozzle being opposite a first inner end of said second chamber, and wherein a distance D separates the first end of said first chamber from the first inner end of said second chamber;

an elongated cylindrical structure comprising at least one filter material housed in said container and extending into said second chamber about said gas exit nozzle of said first chamber a distance L from the first end of said first chamber toward the first inner end of said second chamber, said filter structure being secured about said first end portion of said first chamber and defining an inner mixing zone in said second chamber for mixing at least a portion of the particulate-containing generated hot gas with at least a portion of the stored gas to form a gas mix, said filter structure being contacted by a gas comprising at least a portion of the particulate-containing generated hot gas and effecting significant reduction in the particulate content of the contacting gas, said filter structure further defining an outer mixing zone in said second chamber wherein an inflation gas for use in inflating the vehicle occupant restraint and comprising a mix of gas of reduced particulate content and stored gas is formed; and a diffuser having at least one controlling orifice for providing passage therein of the inflation gas from said container and at least one exit port for dispensing the inflation gas into the vehicle occupant restraint.

11. The hybrid inflator of claim 10 wherein distance L is substantially the same as distance D.

12. The hybrid inflator of claim 10 wherein distance L is less than distance D.

13. The hybrid inflator of claim 12 wherein a first end of the filter structure is secured about the first end portion of said first chamber and an opposite second end of the filter structure is free standing within said second chamber.

14. The apparatus of claim 10 wherein said filter structure comprises at least one support layer of a woven stainless steel screen having an open area in the range of about 20 to 60 percent.

15. The apparatus of claim 14 wherein said filter structure comprises both an outer and an inner support layer and additionally comprises at least one layer of filter element between.

16. The apparatus of claim 14 wherein said filter structure comprises both an outer and an inner support layer of a woven stainless steel screen having an open area in the range of about 20 to 60 percent and additionally comprises a layer of filter element comprising ceramic paper or ceramic textile therebetween.

17. A method for producing inflation gas in an apparatus suitable for use in inflating a vehicle occupant restraint and comprising a container having a first chamber for storing a gas generating material and a second chamber in which a supply of gas under pressure is stored, said method comprising the steps of:

igniting the gas generating material stored in the first chamber to generate a hot gas, the generated hot gas containing particulate of the gas generating material and byproducts thereof, releasing the particulate-containing generated hot gas from the first chamber into the second chamber by means of at least one gas exit nozzle, the container housing a structure comprising at least one filter material extending into the second chamber about said gas exit nozzle, the filter structure defining an inner mixing zone and an outer mixing zone in the second chamber, mixing at least a portion of the particulate-containing generated hot gas with at least a portion of the stored gas in the inner mixing zone to form a gas mix, contacting the filter structure with a gas comprising at least a portion of the particulate-containing generated hot gas to effect significant reduction in the particulate content of the contacting gas, mixing gas of reduced particulate content and stored gas in the outer mixing zone to form an inflation gas for use in inflating the vehicle occupant restraint, and passing the inflation gas by means of a diffuser having at least one controlling orifice for providing passage therein of at least a portion of the inflation gas and at least one exit port for dispensing at least a portion of the inflation gas passing therein into the vehicle occupant restraint.

18. The method for producing inflation gas of claim 17 wherein the filter structure has an inner and an outer surface and said contacting step comprises contacting the inner surface with at least a portion of the gas comprising the particulate-containing generated hot gas to effect particulate condensation on the inner surface of the filter structure and particulate entrapment in said filter material as at least a portion of the particulate-containing generated hot gas passes therethrough upon contact therewith.

19. The method for producing inflation gas of claim 18 wherein said contacting step additionally comprises contacting the outer surface of the filter structure with at least a portion of the gas comprising the particulate-containing generated hot gas to effect particulate condensation on the outer surface of the filter structure.

20. The method for producing inflation gas of claim 18 wherein there is at least an approximately 180° cumulative change in gas direction between the releasing of the particulate-containing generated hot gas from said first chamber and the passing of the inflation gas into said diffuser.

* * * * *